United States Patent [19]

Umeda

[11] Patent Number: 4,966,192
[45] Date of Patent: Oct. 30, 1990

[54] ROTARY DIRECTIONAL CONTROL VALVE

[75] Inventor: Hirotaka Umeda, Nagoya, Japan

[73] Assignee: TRW Steering & Industrial Products Co., Ltd., Japan

[21] Appl. No.: 410,152

[22] Filed: Sep. 20, 1989

[30] Foreign Application Priority Data

Oct. 17, 1988 [JP] Japan .................. 63-261126

[51] Int. Cl.$^5$ .............................. F15B 13/02
[52] U.S. Cl. .................. 137/625.23; 137/625.24; 91/375 A
[58] Field of Search ............ 137/625.21, 625.22, 137/625.23, 625.24; 91/375 A, 375 R

[56] References Cited

U.S. PATENT DOCUMENTS

4,819,545  4/1989  Dymond ............... 91/375 A X
4,877,100 10/1989  Emiori ................ 91/375 A X Primary Examiner—Alan Cohan
Attorney, Agent, or Firm—Tarolli, Sundheim & Covell

[57] ABSTRACT

The rotary directional control valve comprises a ring mechanism which is formed in the inner peripheral surface thereof with ball fitting grooves which cooperate with the ball fitting groove or grooves of the input shaft through first balls to regulate the relative position of the ring mechanism with respect to the input shaft in a radial direction thereof and on an end surface thereof with cam surfaces which cooperate with the cam surfaces of the outer valve through second balls to restrict the rotation of the input shaft in the circumferential direction thereof with respect to the outer valve. The ring mechanism includes a ring member which is formed with the cam surfaces on one end surface thereof and rotatable in the circumferential direction with respect to the input shaft and, in addition, a fixing part for fixing the ring member to the input shaft in a condition that the input shaft is set in its prescribed angular position with respect to the outer valve. Accordingly, in the rotary directional control valve, not only the cam surfaces have the function of restricting and regulating rotation but also the neutral position of the restriction mechanism and the neutral position of the inner valve with respect to the outer valve can be exactly adjusted and attained severally, and therefore, the rotary directional control valve can be readily manufactured.

3 Claims, 12 Drawing Sheets

ROTARY DIRECTIONAL CONTROL VALVE

FIELD OF THE INVENTION AND RELATED ART STATEMENT

The present invention relates to a rotary directional control valve and, more particularly, to a rotary directional control valve which is used for changing over supply/discharge of pressurized hydraulic fluid into/-from two chambers of a cylinder for power steering of an automobile or the like.

Figure 9:
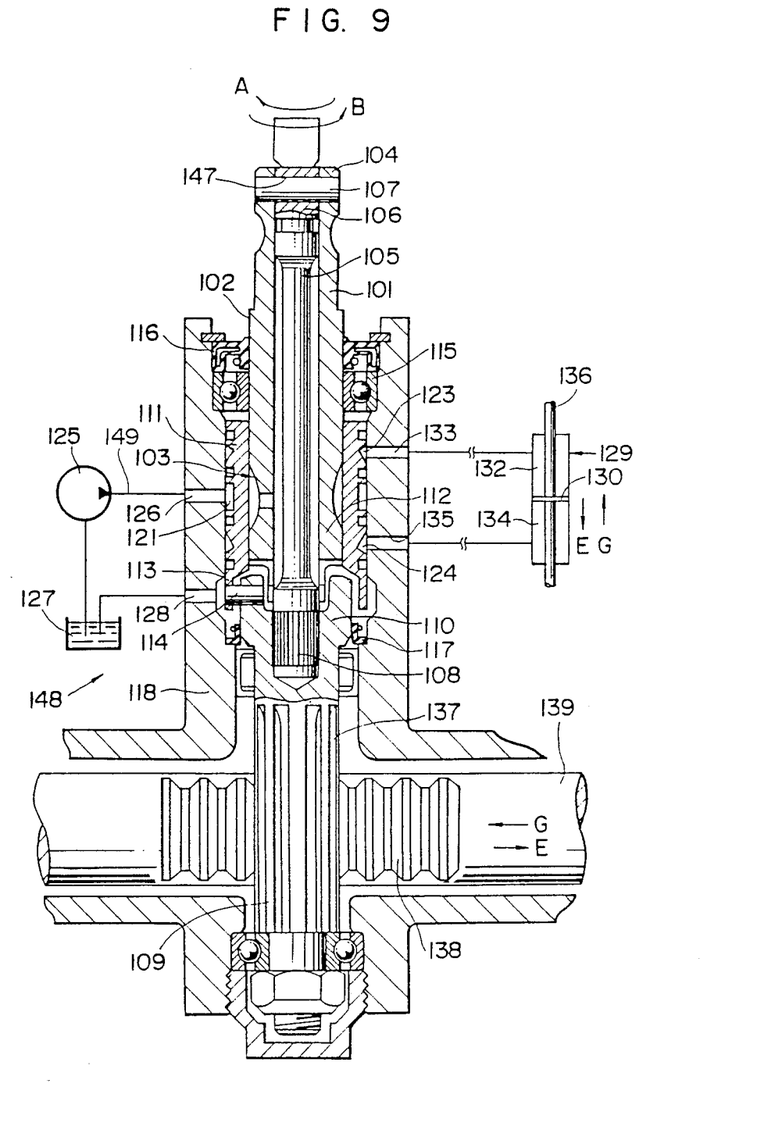
FIG. 9 is a sectional view of a conventional rotary directional control valve having no rotation restriction mechanism in the case of application to a power steering of vehicle.
Figure 10:
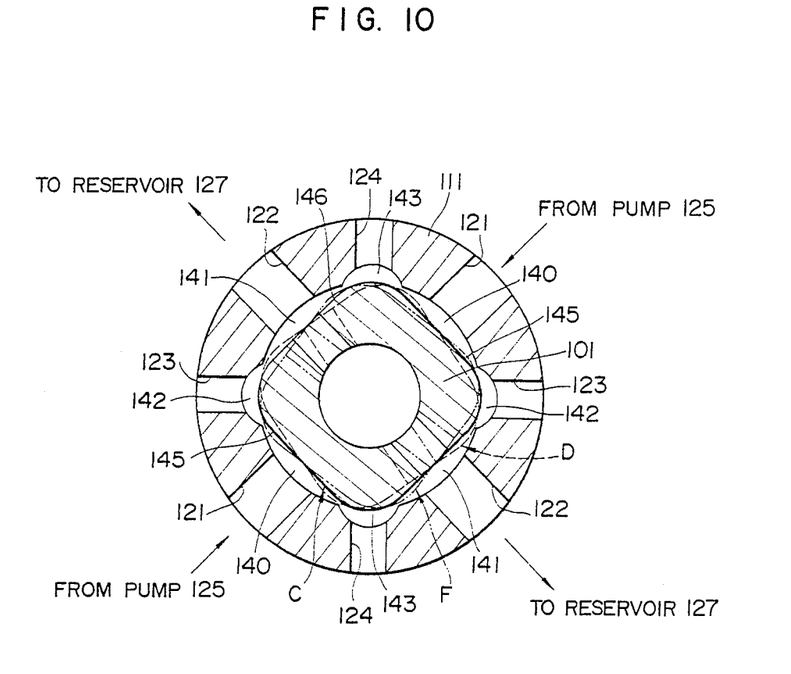
FIG. 10 is a schematic sectional view for explanation of the operation of the valve shown in FIG. 9.

FIGS. 9 and 10 show a first example of the conventional rotary directional control valve which makes use of a torsion bar alone.

In FIGS. 9 and 10, a reference numeral 101 denotes a cylindrical input shaft which is formed on an outer peripheral surface 102 thereof with concaved portions 103 serving as an inner valve. A torsion bar 105 is fixed at its one end 106 to an input end 104 of the input shaft 101 through the medium of a pin 107. The torsion bar 105 extends through the interior of the cylindrical input shaft 101, the other end 108 of the torsion bar 105 thus extended and projected being fixed to one end 110 of an output shaft 109 by means of press-fitting or with pins. A reference numeral 111 denotes an outer valve which is fitted on a portion of the input shaft 101 adjacent to the other end 112 thereof. The outer valve 111 is fixed at its one end 113 to the end 110 of the output shaft 109. A reference numeral 115 denotes a bearing for supporting the inner valve 101 which rotates or moves angularly in the directions indicated by arrows A and B with respect to the outer valve 111, and reference numerals 116 and 117 denote oil seals for sealing in liquid-tight manner chambers 140, 141, 142 and 143 defined by the valves 101, 111 and a casing 118.

A reference numeral 125 denotes a pump connected to an inlet port 126 of the casing 118 which is in communication with grooves 121 of the outer valve 111, and a reference numeral 127 denotes a reservoir connected to an outlet port 128 of the casing 118 which is in communication with grooves 122 (see FIG. 10) of the outer valve 111. A reference numeral 129 denotes an hydraulic fluid pressure cylinder the interior of which is partitioned into two cylinder chambers 132 and 134 by a piston 130, the cylinder chamber 132 being connected to a port 133 of the casing 118 which is in communication with grooves 123 of the outer valve 111, while the other cylinder chamber 134 being connected to a port 135 of the casing 118 which is in communication with grooves 124 of the outer valve 111. Although shown as being separated in FIG. 9 for the convenience of conciseness of the drawing, a piston rod 136 of the cylinder device 129 is formed coaxially and integrally with a rack bar 139 which is formed on its surface with rack teeth 138 for meshing engagement with a pinion 137 formed integrally with the output shaft 110.

It is assumed that, when the input shaft 101 and the torsion bar 105 are in their neutral positions, the torsion bar 105 is in a state indicated by a solid line C in FIG. 10. For example, if a force of not smaller than a predetermined magnitude is applied on the input shaft 101 to the portion adjacent to its one end 104 such as to twist it in the direction of the arrow A against the elasticity of the torsion bar 105, the input shaft 101 is rotated in the direction of the arrow A to be brought into a state D indicated by a broken line in FIG. 10. Accordingly, pressurized hydraulic fluid from the pump 125 is supplied to the cylinder chamber 132 through the port 126, the grooves 121, the chambers 140, orifice portions 145 communicated with the inner valve portions 103 (see FIG. 9), the chambers 142, the grooves 123 and the port 133 in the mentioned order. In this case, the hydraulic fluid in the cylinder chamber 134 is returned to the reservoir 127 through the port 135, the grooves 124, the chambers 143, orifice portions 146, the chambers 141, the grooves 122 and the port 128 in the mentioned order. In consequence, a force is applied to move the piston 136 in the direction of the arrow E, thus assisting the rack bar 139 to move in the direction of the arrow E. On the other hand, if a force of not smaller than a predetermined magnitude is applied on the input shaft 101 to the portion adjacent to its one end 104 such as to twist it in the direction of the arrow B against the elasticity of the torsion bar 105, the input shaft 101 is rotated in the direction of the arrow B to be brought into a state F indicated by a phantom line in FIG. 10, with the result that, owing to the flow of oil passing through the variable orifice, an hydraulic fluid pressure is applied to move the rod 136 in the direction of the arrow G, thus assisting the rack bar 139 to move in the direction of the arrow G.

Figure 11:
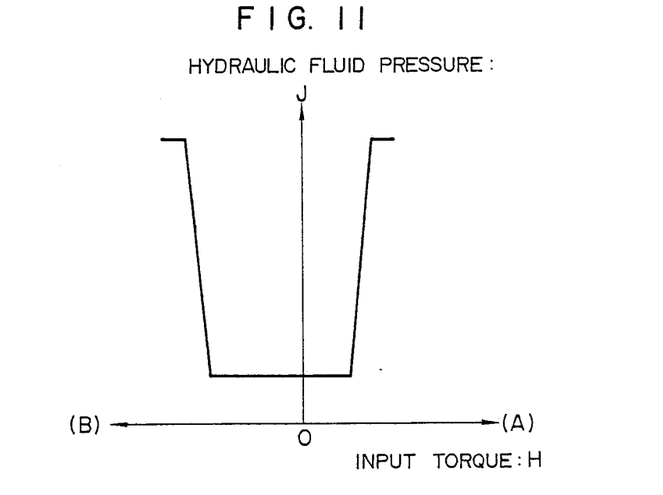
FIG. 11 is a schematic graph for explanation of the operation of the rotary directional control valve when it is not balanced in terms of the rotation in the clockwise and counterclockwise directions.
Figure 12:
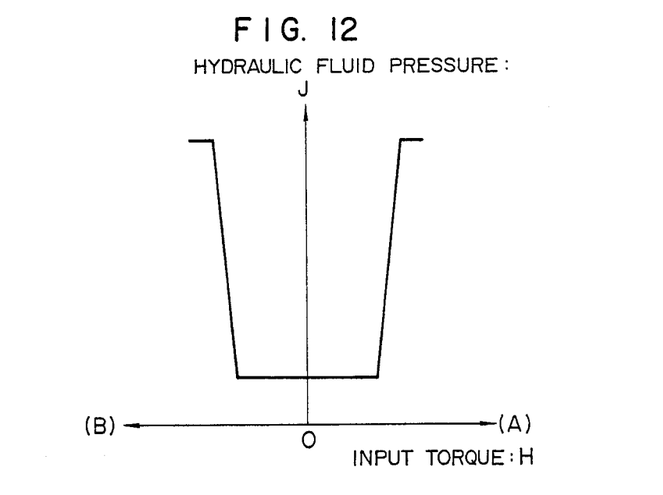
FIG. 12 is a schematic graph for explanation of the operation of the rotary directional control valve when it is adjusted to be well-balanced in terms of the rotation in the clockwise and counterclockwise directions.

In initial setting of the rotary directional control valve 148 described above, the pin 107 is not mounted so that the input end 104 of the input shaft 101 and the input-side end 106 of the torsion bar 105 are temporarily fixed to each other by means of a suitable jig or the like in such a manner that the relative angle is adjustable. A turning torque H (which corresponds to the angle of rotation with respect to the output shaft when the output shaft 109 is substantially fixed) is applied to the ends 104 and 106 thus temporarily fixed in the directions of the arrows A and B such as to measure the change in the hydraulic fluid pressure J in a flow passage 149 interconnecting between the pump 125 and the port 126 in accordance with the change in the torque H, thus obtaining a result shown in FIG. 11, for example. The change in the input torque H shown in FIG. 11 is proportional to the angle of rotation of the input shaft 101 with respect to its temporarily fixed position. For this reason, after releasing the temporary fixing referred above, the input shaft 101 is made to rotate in the direction of the arrow B with respect to the outer valve 111 through an angle that is required for correcting the unbalance appearing in the input torque applied in the directions of the arrows A and B in relation to the angle of rotation as shown in FIG. 11, so that the angular position of the input shaft 101 can be adjusted such as to attain an input torque H - force (or pressure) J characteristic that is symmetric in terms of the left and right directions as shown in FIG. 12. Subsequently, a through hole 147 is formed to extend through the end 104 of the input shaft 101 and the end 106 of the torsion bar 105 while keeping the input shaft 101 in the adjusted position so that the input shaft 101 and the torsion bar 105 are permanently fixed to each other by means of the pin 107 or the like.

Next, description will be given of another conventional example of the rotary directional control valve 150 which has a restriction mechanism for restricting the relative rotation of the input shaft and the output shaft with reference to FIGS. 13 and 14. It is noted that, in FIGS. 13 and 14, the same members and components as those shown in FIGS. 9 to 12 are designated by the same reference numerals.

Figure 13:
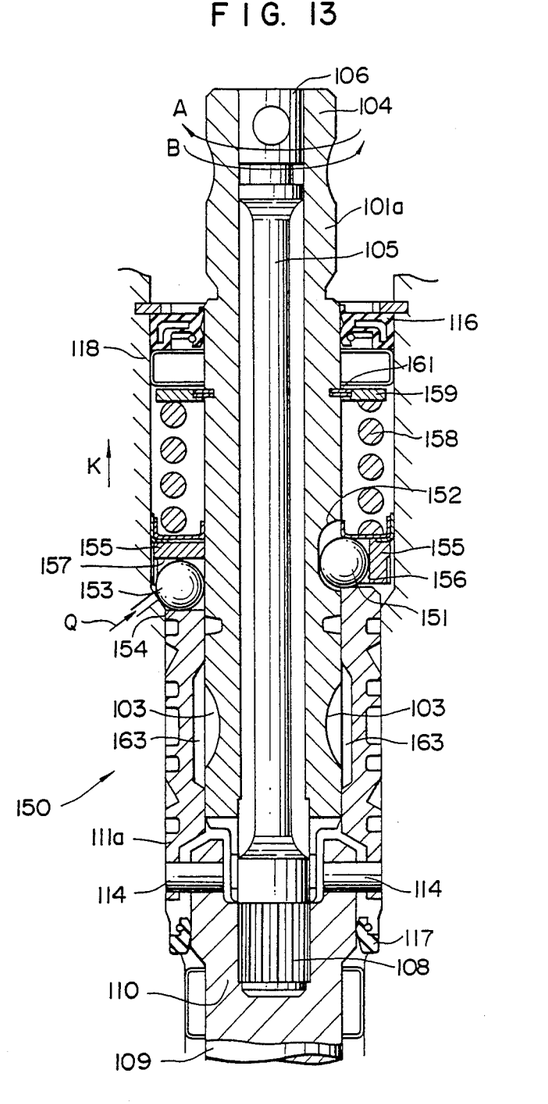
FIG. 13 is a sectional view of a conventional rotary directional control valve having the rotation restriction mechanism.
Figure 14:
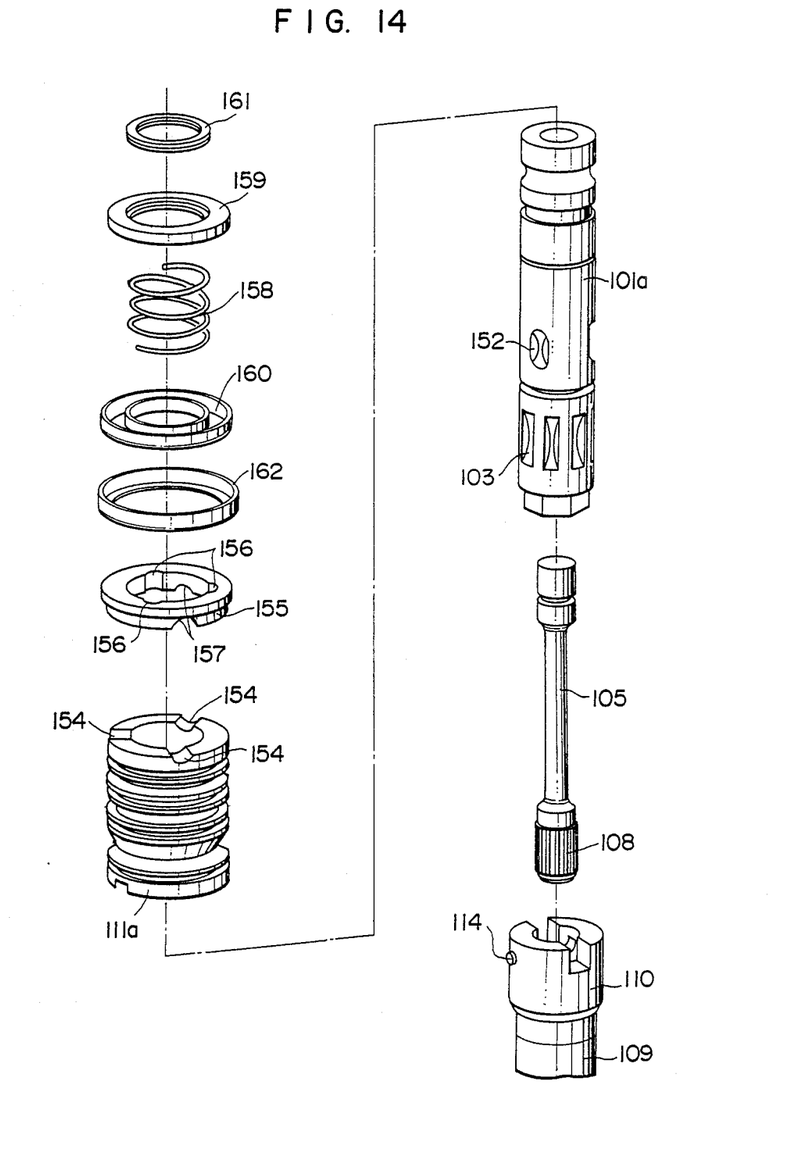
FIG. 14 is an exploded perspective view of the valve shown in FIG. 13, showing the input shaft, torsion bar, various rings and a portion of the outer valve.

In the example shown in FIGS. 13 and 14, an input shaft 101a is formed with grooves 152 for receiving balls 151 at predetermined angular positions with respect to the inner valve portions 103 as exactly as possible. On the other hand, an outer valve 111a is formed on its one end surface with cam surfaces 154 for supporting balls 153 at predetermined angular positions in the directions of the arrows A and B with respect to land chambers 163 as exactly as possible. The land chambers 163 serve to regulate the size of the variable orifice 145 in cooperation with the inner valve portions 103 on the occasion of the relative rotation as shown in FIG. 10. A reference numeral 155 denotes a ring which is formed with grooves 156 for receiving the balls 151. The balls 151 have the role of regulating the position of the ring 155 in the radial direction with respect to the input shaft 101a as well as of forbidding the relative rotation in the directions of the arrow A and B. The ring 155 is further formed with cam surfaces 157 at positions thereof facing the balls 153. A reference numeral 158 denotes a spring; 159 and 160, spring shoes; 161, a stopper ring engaged with the input shaft 101a; and 162, a support ring. Owing to the expansibility of the compression spring 158, the cam surfaces 157 of the ring 155 are pressed against the balls 153 and, further, the balls 153 are pressed against the cam surfaces 154 of the outer valve 111a.

In the rotary directional control valve 150 described above, when the input shaft 101a is caused to make a relative rotation in the directions of the arrows A and B with respect to the outer valve 111a, it is necessary to change the relative position of the cam surfaces 157 and the balls 153 so as to displace the ring 155 in the direction of an arrow K against the expansibility of the spring 158. Accordingly, the relative rotation of the ring 155 in the directions of the arrows A and B with respect to the outer valve 111a, that is, the relative rotation of the input shaft 101a in the directions of the arrows A and B with respect to the outer valve 111a is restricted. It is noted that, by applying a control pressure Q, such as oil pressure, to the cam surfaces 157 engaged with the balls 153 as the reaction force to the restricting force exerted by the spring 158, it is possible to change the magnitude of the restricting force. Namely, it is possible to control the restricting force by controlling the magnitude of the control pressure Q in accordance with the speed, steering angle or the like.

However, in the case of this valve device 150, the position of the restriction mechanism (related to the relative rotation of the cam surfaces 157, 154) and the position of the inner valve 103 (or the input shaft 101a) with respect to the outer valve 111a are regulated simultaneously. For this reason, in order to attain the characteristic which exhibits the balance shown in FIG. 12 in such a state that the restriction mechanism is in its neutral position, not only it is necessary to extremely exactly define the relative angular position of the grooves 152 and the inner valve portions 103 in the directions of the arrows A and B in the input shaft 101a but also it is necessary to extremely exactly define the relative angular position of the land chambers 153 and the cam surfaces 154 in the directions of the arrows A and B in the outer valve 111a. However, it is very difficult to carry out the machining for satisfying these requirements, and such machining will result in a very high cost if it is dared to be carried out.

OBJECT AND SUMMARY OF THE INVENTION

The present invention has been made in view of the above-described problems, and an object of the invention is to provide a rotary directional control valve in which not only cam surfaces have the function of restricting and regulating rotation but also the neutral position of a restriction mechanism and the neutral position of an inner valve with respect to an outer valve can be exactly adjusted and attained severally, and which can be readily manufactured.

According to the present invention, the above-described object can be achieved by a rotary directional control valve in which a ring mechanism includes ring means which is formed with the cam surfaces on one end surface thereof and rotatable in the circumferential direction with respect to an input shaft and, in addition, fixing means for fixing the ring means to the input shaft in a condition that the input shaft is set in its desired angular position with respect to an outer valve.

In the rotary directional control valve according to the present invention, since the ring mechanism includes ring means which is formed with the cam surfaces on one end surface thereof and rotatable in the circumferential direction with respect to the input shaft, even if the relative angular position of the land chamber portions and the cam surfaces in the outer valve and the relative angular position of the grooves and the inner valve portions in the input shaft are not so exactly defined, the relative angular position of the input shaft with respect to the outer valve can be adjusted before the ring means is fixed by means of the fixing means irrespective of the position of the ring. In addition, since it is possible to set the ring means independently in the neutral position of the restriction mechanism, the neutral position of the restriction mechanism and the neutral position of the inner valve with respect to the outer valve can be exactly adjusted and attained severally. Further, since it is not always necessary for such positioning that the machining of the outer valve and the input shaft is performed precisely with accuracy, these members can be readily worked or machined at relatively low cost.

Effects and functions of the present invention will become more clear from the description of preferred embodiments to be described in the following with reference to the accompanying drawings.

DETAILED DESCRIPTION OF THE PREFERRED EMBODIMENTS

Description will be given of a first preferred embodiment of a rotary directional control valve according to the present invention with reference to FIGS. 1 through 5.

In the case of a rotary directional control valve 1 according to this first embodiment, an input shaft 2 is formed with an annular groove 4 for regulating the positions of balls 3 in the radial direction. Namely, a bottom surface 5 of the annular groove 4 is located on a cylindrical surface with a fixed radius about a center axis 7 of the input shaft 2 and a torsion bar 6. The input shaft 2 is formed with inner valve portions 8 which are the same as those in the valve 150 described above. A reference numeral 9 denotes holes used in carrying out the caulking which will be described later. An outer valve 10 is constructed in the same manner as the above described outer valve 111a such as to have land chamber portions 11 which cooperate with the inner valve portions 8 to form variable orifices formed on its inner peripheral surface and cam surfaces 12 formed on its end surface at predetermined positions in the circumferential direction.

Figure 1:
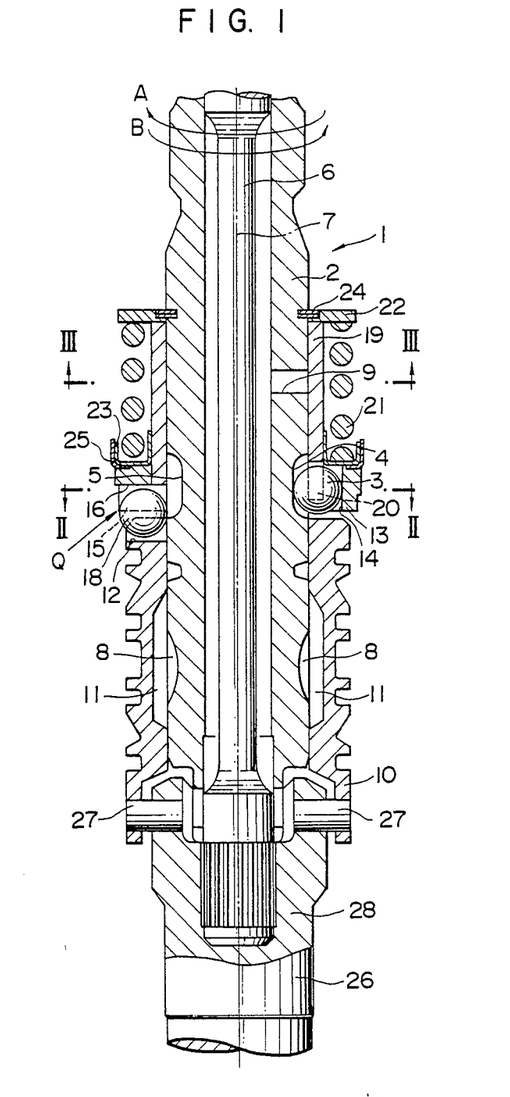
FIG. 1 is a sectional view of a first preferred embodiment of a rotary directional control valve according to the present invention.
Figure 2:
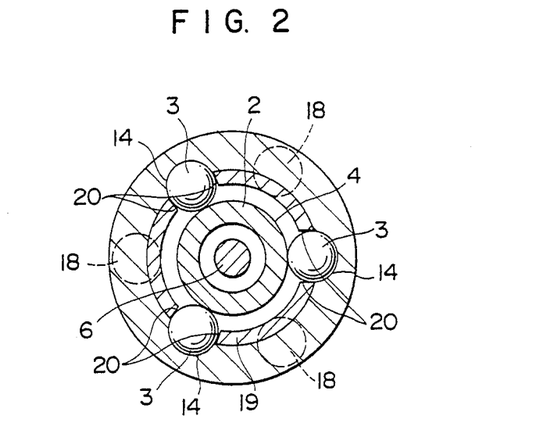
FIG. 2 is a sectional view taken along the line II—II in FIG. 1.
Figure 4:
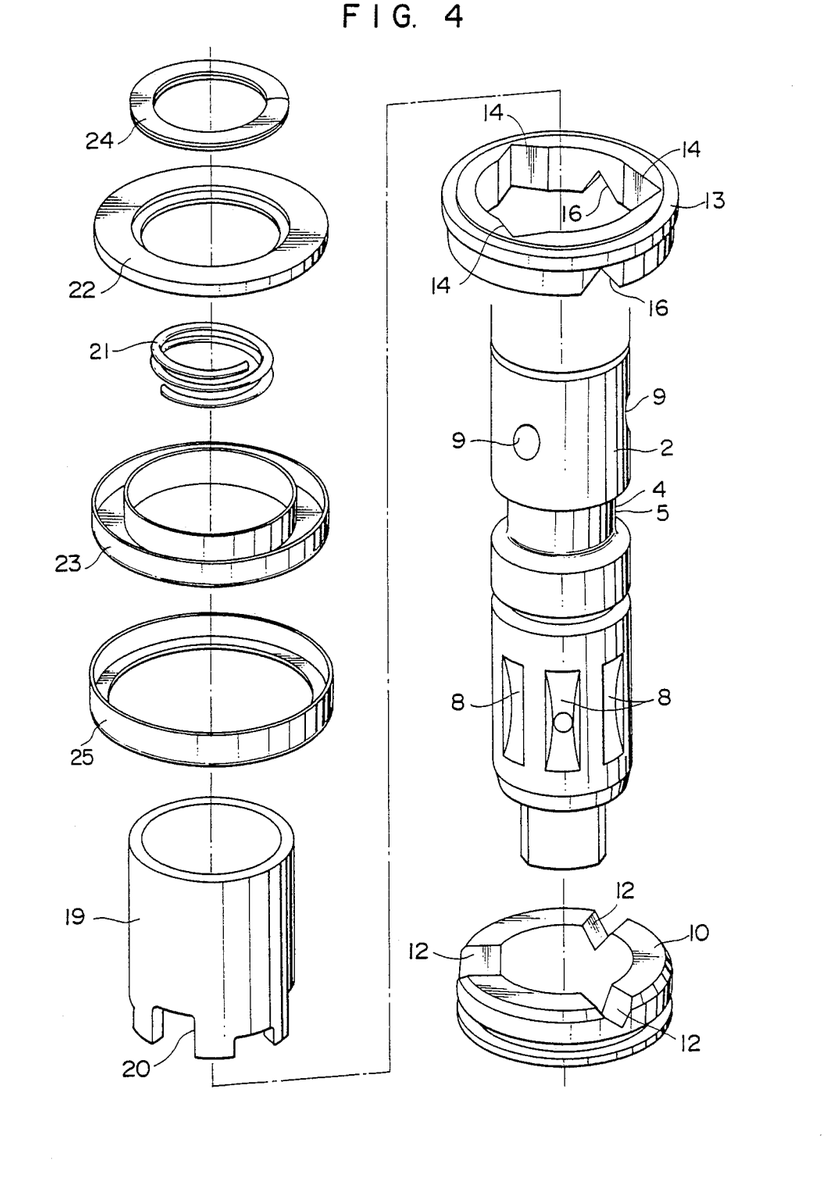
FIG. 4 is an exploded perspective view of the valve shown in FIG. 1, showing an input shaft, various rings and a portion of an outer valve.

A first ring 13 is formed with grooves 14 into which balls 3 are fitted. The radial position of the ring 13 with respect to the input shaft 2 is exactly regulated by the engagement between these grooves 14 and balls 3. The ring 13 is further formed with cam surfaces 16 which are similar to those in the aforementioned ring 155, on its end surface 15 at predetermined positions in the circumferential direction. In this case, although the radial position of the ring 13 with respect to the input shaft 2 is regulated through the balls 3 uniquely or exclusively, the ring 13 is enabled to make a relative rotation with respect to the input shaft 2 in the circumferential directions indicated by arrows A and B. A reference numeral 18 denotes balls disposed between the cam surfaces 16 and 12.

A second ring 19 has an inner diameter that is substantially equal to the outer diameter of the input shaft 2. The ring 19 is formed at its one end portion with grooves 20 at the same angular intervals as the grooves 14 in the ring 13, each of the grooves 20 having a width equal to the diameter of the ball 3. Therefore, the ring 19 is fitted on the input shaft 2 in such a manner that the grooves 20 are engaged with the balls 3 respectively. The ring 19 thus fitted on is made to rotate in the directions of the arrows A and B together with the ring 13, and however, it is rotatable in the directions of the arrows A and B with respect to the input shaft 2.

Similarly to the case of the above-described valve 150, a reference numeral 21 denotes a spring; 22, a spring shoe or retainer; 23, another spring shoe or retainer having the sealing function; 24, a stopper ring engaged with the input shaft 2; and 25, a support ring having the sealing function. In addition, similarly to the case of the valve shown in FIG. 13, a reference numeral 26 denotes an output shaft and a numeral 27 denotes pins for fixing one end 28 of the output shaft 26 and the outer valve 10 to each other. Although not shown in FIGS. 1 to 4, a casing similar to that used in the valve shown in FIG. 9 is provided, which casing is connected to a pump and cylinder device as is the case shown in FIG. 9, for example. The output shaft 26 has a pinion which is in meshing engagement with rack teeth formed at the other end thereof as is the case shown in FIG. 9, for example.

In the rotary directional control valve 1 having the construction described above, after the valve characteristic such as shown in FIG. 11 is measured in a condition that the input shaft 2 and the torsion bar 6 are temporarily fixed to each other, temporary fixing between the input shaft 2 and the torsion bar 6 is released so that the input shaft 2 is allowed to make a relative rotation with respect to the outer valve 10 through a desired angle suggested or determined from the characteristic thus measured or observed and, accordingly, the relative angular positions of the inner valve portions 8 of the input shaft 2 with respect to the land chamber portions 11 can be adjusted (adjustment of the neutral position is made between the valves 8 and 10) in such a manner that the characteristic shown in FIG. 12 is obtainable. Then, the input shaft 2 is fixed to the torsion bar 6 by means of the pin or the like. Subsequently, the ring 19 is caused to make a relative rotation together with the ring 13 with respect to the input shaft 2 (accordingly, with respect to the outer valve 10) so that the positions of the cam surfaces 16 of the ring 13 are exactly set in position with respect to the cam surfaces 12 of the outer valve 10 (adjustment of the neutral position of the restriction mechanism is made). Upon the completion of the position setting referred above, the ring 19 is caulked at portions thereof corresponding to the holes 9 of the input shaft 2 as indicated by phantom lines M in FIG. 3 to thereby fix the ring 19 to the input shaft 2 permanently.

In the rotary directional control valve 1 described above, since the adjustment of the neutral position between the valves and the adjustment of the neutral position of the restriction mechanism can be made independently of each other, it is not always necessary to exactly set the relative angular position of the cam surfaces 12 of the outer valve 10 and the land chambers 11 and the relative angular position of the inner valve portions 8 of the input shaft 2 and the groove 4 (because the groove 4 is the annular groove in this case). In consequence, it is possible to keep down the processing and manufacturing costs.

Figure 3:
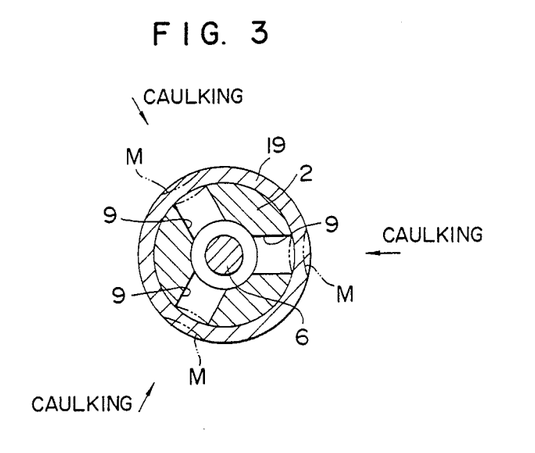
FIG. 3 is a sectional view taken along the line III—III in FIG. 1.
Figure 5:
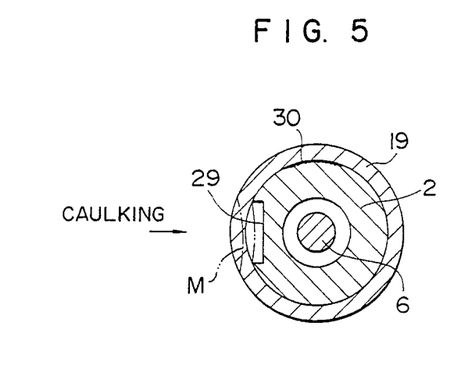
FIG. 5 is an illustration showing a modification of the fixing means shown in FIG. 3.
Figure 15:
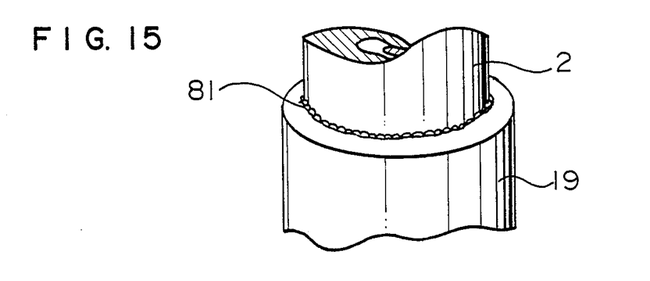
FIGS. 15 to 17 are explanatory views of three kinds of modification of fixing means.
Figure 16:
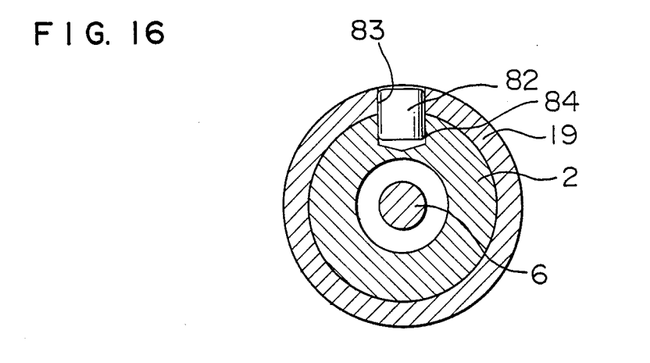
Figure 17:
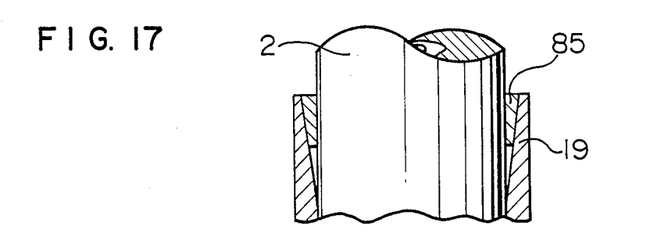

In addition, in place of the holes 9 for caulking formed in the input shaft 2 at several circumferential points thereof as shown in FIG. 3, the input shaft may be formed with grooves or, further, may be formed with a groove (or hole) 29 in a portion thereof and a coarse surface portion 30 in another portion thereof apart from the groove 29 in the circumferential direction so that the ring 19 is caulked at a point thereof corresponding to the groove 29, as shown by M in FIG. 5. Plural coarse surface portions 30 may be provided. Furthermore, the ring 19 and the input shaft 2 may be permanently fixed to each other by means of a welded part 81 produced by welding such as laser welding as shown in FIG. 15, fixing with a pin 82 fitted or press-fitted in holes 83, 84 perforated after adjustment as shown in FIG. 16, adhesives or screws, or fixing by press-fitting of tapered locking means such as a taper key and a taperbush 85 shown in FIG. 17 or the like, in place of caulking.

Further, in the case of the valve 1 as well, by applying a control pressure Q, such as hydraulic fluid pressure, to the cam surfaces 16 engaged with the balls 18 as the reaction force to the restricting force exerted by the spring 21, it is possible to change the magnitude of the restricting force. Namely, it is possible to control the restricting force by controlling the magnitude of the control pressure Q in accordance with the speed, steering angle and the like.

Figure 6:
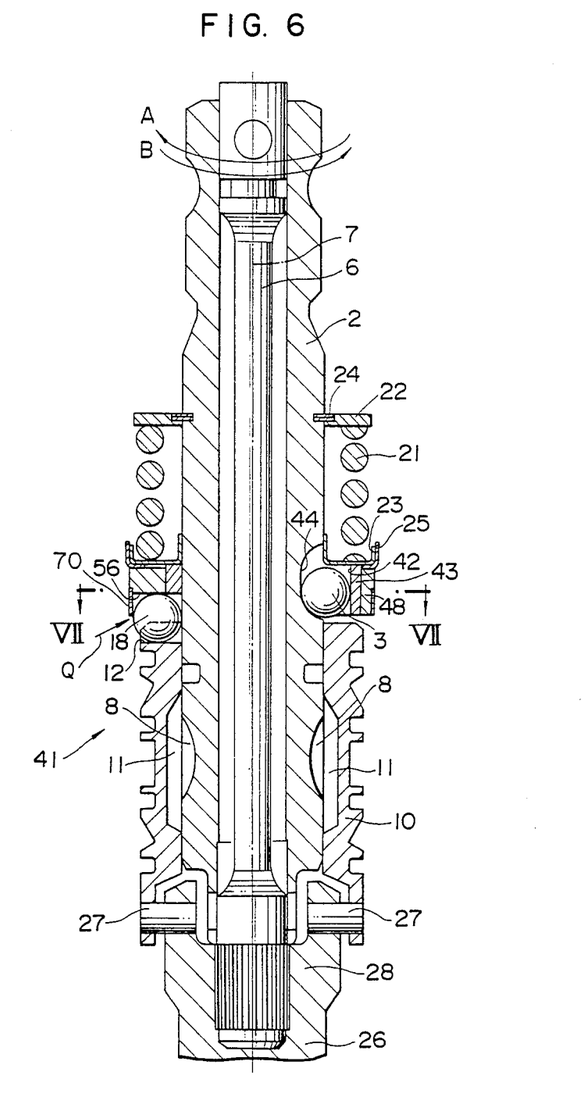
FIG. 6 is a sectional view of a second preferred embodiment of the rotary directional control valve according to the present invention.
Figure 7:
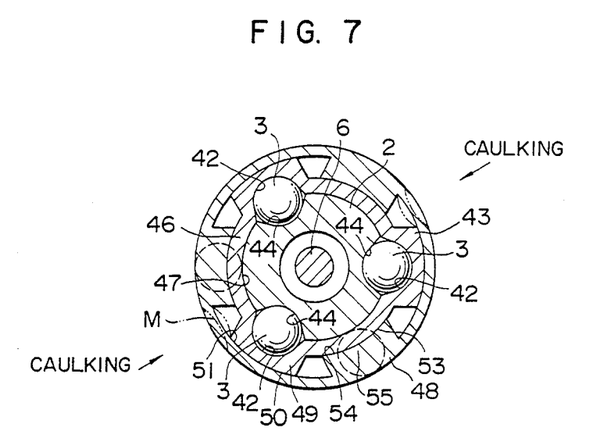
FIG. 7 is a sectional view taken along the line VII—VII in FIG. 6.
Figure 8:
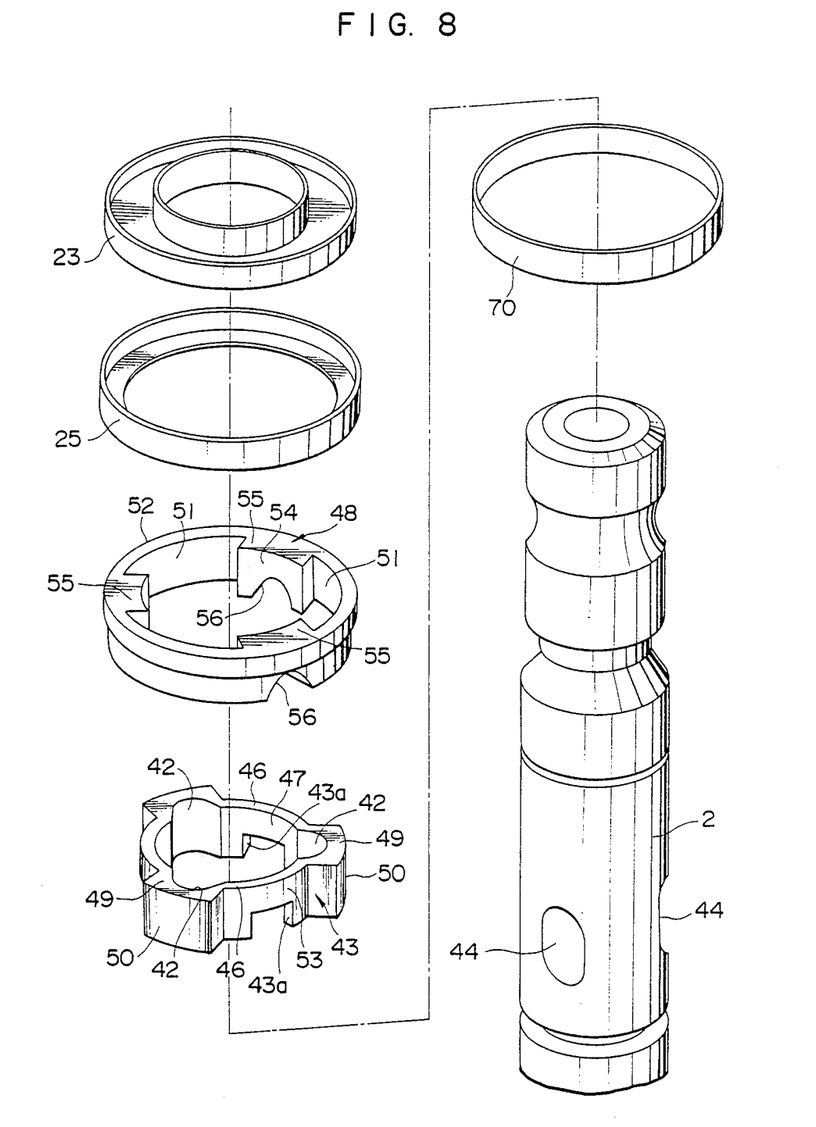
FIG. 8 is an exploded perspective view of the valve shown in FIG. 6, showing a portion of the input shaft and various rings.

FIGS. 6 to 8 illustrate a rotary directional control valve 41 in accordance with a second preferred embodiment of the present invention. In this control valve 41, the same or similar members and elements as those in the control valve 1 according to the first embodiment are designated by the same reference numerals.

In the case of the control valve 41, a ring 43 having grooves 42 formed at regular angular intervals in the circumferential direction is engaged with balls 3 fitted in grooves 44 formed in the outer peripheral surface of the input shaft 2 at regular angular intervals in the circumferential direction so that the relative rotation of the ring 43 in the circumferential directions of the arrows A and B with respect to the input shaft 2 is prohibited. Inner peripheral surfaces 47 of cylindrical portions 46 of the ring 43 have a shape complementary to the shape of the outer peripheral surface of the input shaft 2 so that the ring is fitted on the outer periphery of the input shaft 2 to a nicety. A reference numeral 43a denotes recesses each being larger than the ball 18.

Another ring 48 has a cylindrical portion 52 having an inner peripheral surface 51 of the shape complementary to the shape of outer peripheral surfaces of projections 49 provided in correspondence to the grooves 42 of the ring 43 and projections 55 each having an inner peripheral surface 54 of the shape complementary to the shape of outer peripheral surfaces of the cylindrical portion 46 of the ring 43. It is noted here that the angular interval or the circumferential internal between the ajasent projections 49 of the ring 43 is larger than the circumferential or angular extent or width of each projection 55 of the ring 48 so that the rings 43 and 48 are enabled to make relative rotation in the circumferential direction within a certain range of angles when they are mounted.

The ring 48 is formed with cam surfaces 56 at regular intervals in the circumferential direction, the cam surfaces 56 being the same as the cam surfaces 16 of the ring 13 of the valve 1. The cam surfaces 56 are pressed against the balls 18 under the elastic load exerted by the spring 21. A reference numeral 70 denotes a ring fitted on the small-diameter portion of the ring 48 for the purpose of preventing the balls 18 from coming off.

In the rotary directional control valve 41 having the construction described above, after the valve characteristic such as shown in FIG. 11 is measured in a condition that the torsion bar 6 is temporarily fixed to the input shaft 2, temporary fixing between the input shaft 2 and the torsion bar 6 is released so that the input shaft 2 is allowed to make a relative rotation with respect to the outer valve 10 through a desired angle suggested or determined from the characteristic thus measured or observed and, accordingly, the relative angular positions of the inner valve portions 8 of the input shaft 2 with respect to the land chamber portions 11 of the outer valve 10 can be adjusted. Then, the input shaft 2 is fixed to the torsion bar 6 by means of the pin or the like. Subsequently, the ring 48 is caused to make a relative rotation with respect to the ring 43 and the input shaft 2 (accordingly, with respect to the outer valve 10) so that the positions of the cam surfaces 56 of the ring 48 are exactly set in position with respect to the cam surfaces 12 of the outer valve 10. Upon the completion of the position setting referred above, the cylindrical portions 52 of the ring 48 are caulked as indicated by phantom lines M in FIG. 7 to thereby fix the ring 48 to the input shaft 2.

In this rotary directional control valve 41, rotation is regulated owing to the engagement between the spring-loaded cam surfaces 56, 12 and the balls 18.

In addition, in the case of this valve 41 as well, by applying a control pressure Q, such as hydraulic fluid pressure, to the cam surfaces 56 engaged with the balls 18 as the reaction force to the restricting force exerted by the spring 21, it is possible to change the magnitude of the restricting force. Namely, it is possible to control the restricting force by controlling the magnitude of the control pressure Q in accordance with the speed, steering angle and the like.

What is claimed is:
1. A rotary directional control valve comprising:
a cylindrical input shaft which is formed with ball fitting groove means in one portion of an outer peripheral surface thereof and with an inner valve in another portion of the outer peripheral surface thereof axially apart from said ball fitting groove means and an outer valve which is fitted on a portion of said input shaft adjacent to its one end, fixed at one end thereof to one end of an output shaft, and formed at the other end thereof with cam surfaces, said inner and outer valves defining therebetween a variable orifice which serves to change the flowing direction and pressure of hydraulic fluid in accordance with rotation of said input shaft with respect to said outer valve, said control valve further comprising a ring mechanism which is formed in an inner peripheral surface thereof with ball fitting grooves which cooperate with said ball fitting groove means of said input shaft through first balls to regulate the relative position of said ring mechanism with respect to said input shaft in a radial direction thereof and on an end surface thereof with cam surfaces which cooperate with said cam surfaces of said outer valve through second balls to restrict the rotation of said input shaft in the circumferential direction threof with respect to said outer valve, said ring mechanism including ring means which is formed with said cam surfaces on one end surface thereof and rotatable in the circumferential direction with respect to said input shaft and, further, fixing means for fixing said ring means to said input shaft in a condition that said input shaft is set in a desired angular position with respect to said outer valve.

2. A valve according to claim 1, wherein said ball fitting groove means of said input shaft comprises a circumferentially extended annular groove, and said ring mechanism further comprises a second cylindrical ring means fitted around said input shaft and having grooves at one end thereof in which said first balls are fitted, said second ring means being fixed to said input shaft by said fixing means.

3. A valve according to claim 1, wherein said ball fitting groove means of said input shaft comprises a plurality of grooves provided at angularly regular intervals, and said ring mechanism further comprises a second ring means having said ball fitting grooves and fitted in said first-mentioned ring means, said first mentioned ring means being fixed to said input shaft through said second ring means and said fixing means.

* * * * *